United States Patent
Taniguchi et al.

(10) Patent No.: US 8,174,966 B2
(45) Date of Patent: May 8, 2012

(54) SWITCHING PROGRAM, SWITCHING METHOD AND DUPLEX SYSTEM

(75) Inventors: Kazuhiro Taniguchi, Kawasaki (JP); Teruyuki Goto, Kawasaki (JP); Yoshiaki Teruta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 174 days.

(21) Appl. No.: 12/576,082

(22) Filed: Oct. 8, 2009

(65) Prior Publication Data

US 2010/0020678 A1 Jan. 28, 2010

Related U.S. Application Data

(63) Continuation of application No. PCT/JP2007/058987, filed on Apr. 25, 2007.

(51) Int. Cl.
*H04J 1/00* (2006.01)
(52) U.S. Cl. ............................................. 370/220; 714/2
(58) Field of Classification Search .......... 370/216–228; 714/1–24
See application file for complete search history.

(56) References Cited

U.S. PATENT DOCUMENTS

| | | | |
|---|---|---|---|
| 7,383,264 B2 | 6/2008 | Sutoh et al. | |
| 2001/0027453 A1 | 10/2001 | Suto | |
| 2002/0129146 A1 | 9/2002 | Aronoff et al. | |
| 2005/0283504 A1 | 12/2005 | Suzuki et al. | |
| 2007/0226220 A1* | 9/2007 | Aronoff et al. ................ | 707/8 |

FOREIGN PATENT DOCUMENTS

| | | |
|---|---|---|
| JP | 2001-344141 | 12/2001 |
| JP | A 2004-348701 | 12/2004 |
| JP | A 2006-4147 | 1/2006 |

OTHER PUBLICATIONS

Office Action issued by the Patent Office of Japan for corresponding JP Application No. 2009-512839, mailed Jan. 17, 2012 (with partial English language translation).

* cited by examiner

*Primary Examiner* — Pao Sinkantarakorn

(74) *Attorney, Agent, or Firm* — Greer, Burns & Crain, Ltd.

(57) ABSTRACT

When a switching unit of each of first DB servers receives a transaction-stop instruction request from a second DB server, the switching unit performs a transaction-stop instruction process. When a transaction processing unit of each of the first DB servers receives a transaction stop instruction from the switching unit, the transaction processing unit performs a transaction stop process. In the same manner, a transaction processing unit of the second DB server performs a transaction stop process. Each of the transaction processing units of the first and second DB servers determines whether a transaction is to be stopped depending on a processing attribute and a processing state of an SQL included in the transaction and then performs the transaction stop process depending on a determination result of the processing attribute and the processing state.

15 Claims, 7 Drawing Sheets

SWITCHING PROGRAM, SWITCHING METHOD AND DUPLEX SYSTEM

CROSS-REFERENCE TO RELATED APPLICATION

This application is a continuation of PCT international application Ser. No. PCT/JP2007/058987 filed on Apr. 25, 2007 which designates the United States, the entire contents of which are incorporated herein by reference.

FIELD

The embodiments discussed herein are directed to a switching program, a switching method and a full duplex system.

BACKGROUND

A full duplex system (see FIG. 7) in which an operating node and a standby node are operated completely independently has been conventionally used by companies, or the like, for the purpose of maintaining the absolutely stable operation of a database. The full duplex system maintains the standby node in a startup state, so that the full duplex system achieves data synchronization between a database in the operating node and a database in the standby node by using an update difference log, and performs a switching process between the operating node and the standby node on the second time scale.

Technologies for quickly performing a switching process to switch a standby node to a new operating node if a problem occurs in an operating node of a system, such as a full duplex system, has already been disclosed (see, for example, Japanese Laid-open Patent Publication No. 2004-348701). Generally, if a problem is detected in an operating node of a full duplex system, a switching process is performed to switch a standby node to a new operating node after processing (for example, transaction processing) performed by the operating node is stopped, so that the processing performed by the operating node is taken over by the new operating node.

In the above conventional technology, there are problems in that it is difficult for a user to select a transaction to be stopped from transactions being processed by the operating node and, because the conventional technology usually employs a method for switching a standby node to a new operating node after all transactions being processed by the operating node have been completed, the standby node may not be quickly switched to the new operating node.

For example, if a problem is detected in some operating nodes of a full duplex system (a full duplex system having a configuration that allows for expandability) that includes a plurality of nodes, not only the operating nodes but also an AP (application) server need to be concurrently switched over or, because consistency of information managed by a DBMS (database management system) needs to be ensured, each of standby nodes that are pairs of all operating nodes, including properly operating nodes, in the full duplex system needs to be switched to a new operating node (see FIG. 8). Because it is necessary to stop transactions being processed in all operating nodes before a switching process is performed, there is a problem in that sometimes each of the standby nodes that are pairs of all operating nodes, including the properly operating nodes, in the full duplex system may not be switched quickly to a new operating node. Although the transaction processing is usually stopped by using a method of stopping an instance of a DBMS in a conventional technology, because it is necessary to wait for completion of all termination processes, such as a rollback process or an abnormality recovery process, in such a method, the method may not be used if a switching process needs to be performed quickly.

SUMMARY

According to an aspect of an embodiment of the present invention, a switching method for use in a full duplex system includes an operating node for processing a transaction that is a unit of a series of processes and a standby node for recovering the transaction processed by the operating node. The operating node and the standby node are independently operated. The switching method includes determining, if a problem occurs in the operating node, a processing attribute and a processing state of the transaction processed by the operating node; executing a stop process to stop the transaction processed by the operating node depending on a determination result of the processing attribute and the processing state determined at the determining; and switching the standby node to a new operating node after the stop process is executed at the executing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of a switching program, a switching method, and a full duplex system according to the present invention will be explained in detail with reference to accompanying drawings. In the following descriptions, a full duplex system to which a switching program according to the present invention is applied will be explained as an embodiment of the switching program in a first embodiment of the present invention, and then another embodiment of the present invention will be explained.

In the first embodiment described below, an explanation will be sequentially given of an overview and characteristics of the full duplex system according to the first embodiment, a configuration and an operation of a DB (database) server included in the full duplex system, and advantages of the first embodiment.

Figure 1:
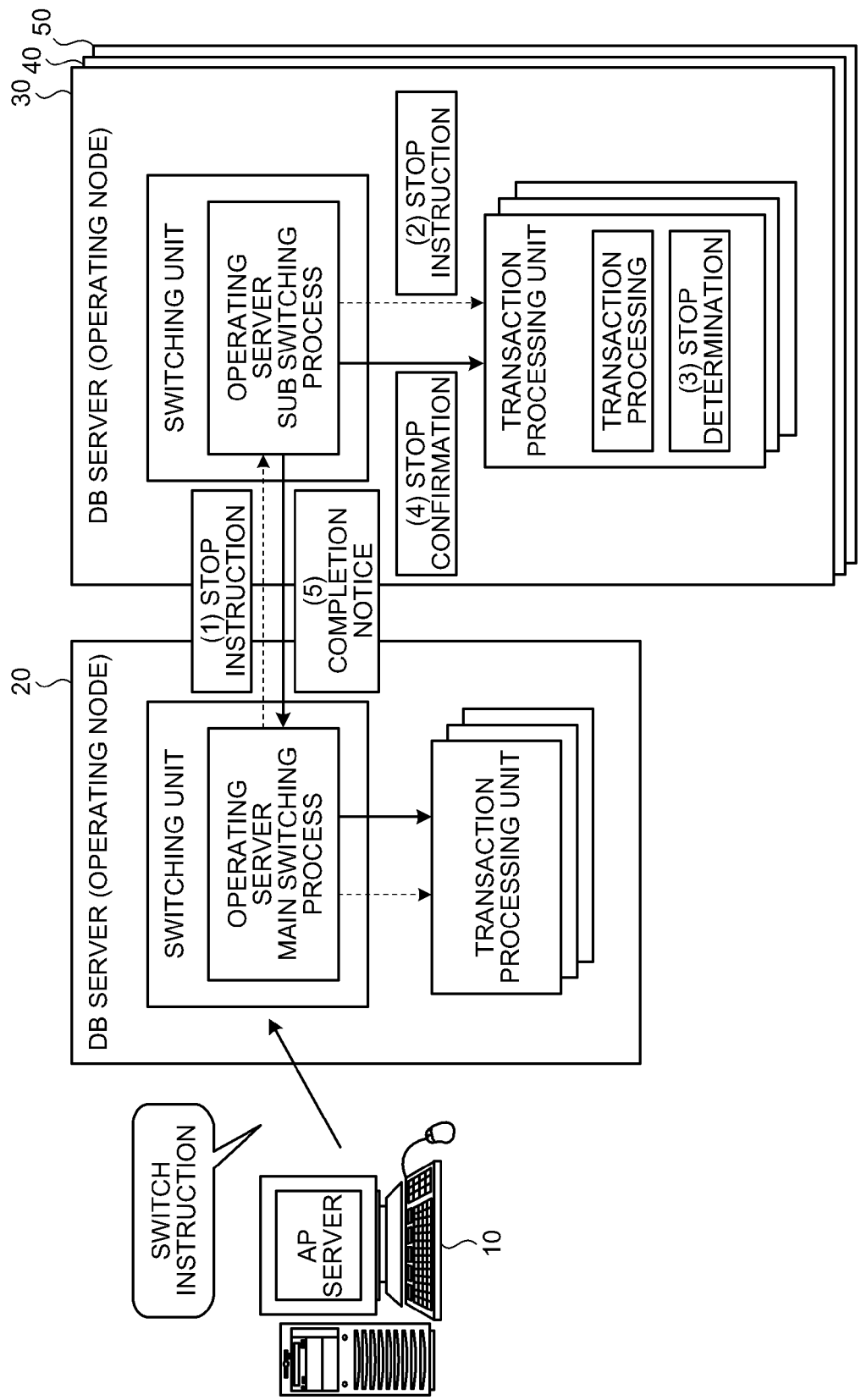
FIG. 1 is a diagram that explains an overview and characteristics of a full duplex system according to a first embodiment.

An explanation will be given of the overview and characteristics of the full duplex system according to the first embodiment with reference to FIG. 1. FIG. 1 is a diagram that explains the overview and characteristics of the full duplex system according to the first embodiment.

The overview of the full duplex system according to the first embodiment is that the full duplex system includes an operating node that processes a transaction that is a unit of a series of processes and a standby node that recovers the transaction processed by the operating node and the operating node and the standby node are independently operated so that if a problem occurs in the operating node, the standby node is switched to a new operating node.

The main characteristic of the full duplex system according to the first embodiment is that, if the standby node is to be switched to a new operating node, a stop process performed on the transaction being processed by the operating node can be quickly completed so that the standby node can be promptly switched to a new operating node.

A concrete explanation will be given of the main characteristic of the full duplex system. As depicted in FIG. 1, the full duplex system according to the first embodiment includes an AP (application) server 10 and DB (database) servers 20 to 50 that are connected such that they can communicate with one another. Although not depicted, the full duplex system according to the first embodiment is fully duplexed by using operating nodes and standby nodes, and if one functions as the operating node, the other functions as the standby node.

In the full duplex system that has the above configuration, when a switching unit of the DB server 20 that functions as an operating node receives a switch instruction from the AP server 10, the switching unit issues a transaction-stop instruction request to the DB servers 30 to 50 (see (1) in FIG. 1) and performs a transaction-stop instruction process. A brief explanation will be given of the transaction-stop instruction process. The switching unit of the DB server 20 sets a process-stop instruction state in a reference memory that can be referred to by a transaction processing unit of the DB server 20 and then performs a process for issuing a transaction stop instruction to the transaction processing unit of its node.

Upon receiving the transaction-stop instruction request from the DB server 20, a switching unit of each of the DB servers 30 to 50 performs a transaction-stop instruction process in the same manner as the DB server 20 (see (2) in FIG. 1). Upon receiving the transaction stop instruction from the switching unit, a transaction processing unit of each of the DB servers 30 to 50 performs a transaction stop process (see (3) in FIG. 1). In the same manner, the transaction processing unit of the DB server 20 performs the transaction stop process.

A brief explanation will be given of the transaction stop process. Each of the transaction processing units of the DB servers 20 to 50 determines whether a transaction is to be stopped on the basis of the processing attribute and the processing state of an SQL (structured query language) included in the transaction and performs the transaction stop process on the basis of a determination result.

A further explanation will be given of the DB server 20. After the switching unit of the DB server 20 performs the transaction-stop instruction process, the switching unit of the DB server 20 issues a transaction-stop confirmation request to the DB servers 30 to 50.

After the switching unit of each of the DB servers 30 to 50 performs the transaction-stop instruction process, the switching unit performs a transaction-stop confirmation process to confirm whether the transaction stop process has been completed by the transaction processing unit (see (4) in FIG. 1). Upon receiving the transaction-stop confirmation request from the DB server 20, the switching unit of each of the DB servers 30 to 50 issues a completion notice of the transaction stop process to the DB server 20 (see (5) in FIG. 1).

A further explanation will be given of the DB server 20. The switching unit of the DB server 20 confirms whether the completion notice of the transaction stop process has been received from the DB servers 30 to 50. If the switching unit of the DB server 20 has received the completion notice from all of the DB servers 30 to 50, the switching unit of the DB server 20 performs a stop confirmation process to confirm whether the transaction stop process has been completed by the transaction processing unit of its node. If the switching unit confirms that the transaction stop process has been completed by the transaction processing unit of its node in the stop confirmation process, the switching unit of the DB server 20 ensures that the entire update log is restored on the standby node and also causes the DB servers 30 to 50 to ensure that the entire update log is restored on the standby nodes. A part of processing, such as the process for restoring the update log on the standby node, performed by the switching unit can be performed by the standby node.

After ensuring that the update log is restored on the standby node, the switching unit of each of the DB servers 20 to 50 concurrently switches the standby node to a new operating node.

Thus, in the full duplex system according to the first embodiment, it is possible to quickly complete the stop process for the transaction being processed by the operating node, thereby promptly switching the standby node to a new operating node.

Figure 2:
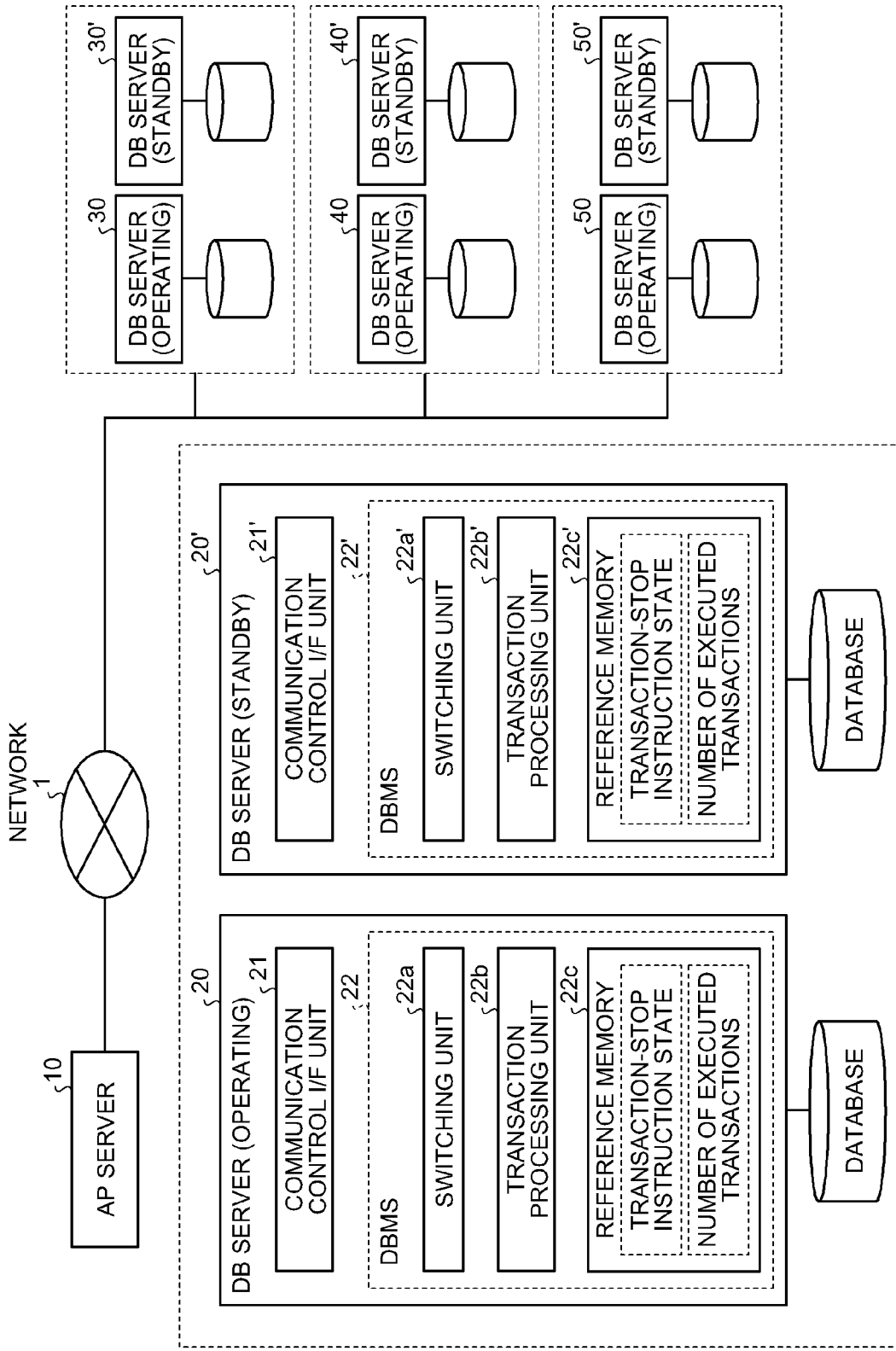
FIG. 2 is a block diagram that illustrates a configuration of a DB (database) server according to the first embodiment.

An explanation will be given of the configuration of the DB server according to the first embodiment with reference to FIG. 2. FIG. 2 is a block diagram that illustrates the configuration of the DB server according to the first embodiment.

The full duplex system according to the first embodiment is fully duplexed by using the operating nodes and the standby nodes. The DB server 20 (operating) is arranged as the operating node and a DB server 20' (standby) is arranged as the standby node.

Because the DB server 20 (operating) and the DB server 20' (standby) have the same configuration, only the configuration of the DB server 20 (operating) will be explained. Only processing components necessary for implementing the DB server 20 according to the first embodiment are illustrated in FIG. 2, and other processing components are omitted.

As depicted in FIG. 2, the DB server 20 includes a communication control interface (I/F) unit 21 and a DBMS (database management system) 22. The communication control I/F unit 21 controls communication of various types of information to be transmitted between the DB server 20 and the AP server 10 or the DB servers 30 to 50.

The DBMS 22 includes an internal memory in which predetermined control programs, computer programs for defining various procedures, and necessary data are stored. The DBMS 22 performs various processes by using the programs and the data stored in the internal memory. The DBMS 22 includes a switching unit 22a, a transaction processing unit 22b, and a reference memory 22c that are the components closely associated with the present invention.

The reference memory 22c stores therein a process-stop instruction state set by the switching unit 22a and the number of executed transactions that is incremented or decremented by the transaction processing unit 22b.

The switching unit 22a performs the transaction-stop instruction process and the transaction-stop confirmation process. The transaction-stop instruction process is performed to cause the transaction processing unit 22b to stop transaction processing. The transaction-stop confirmation process is performed to confirm whether the transaction stop process performed by the transaction processing unit 22b has been completed.

A concrete explanation will be given of the contents of the transaction-stop instruction process. The switching unit 22a sets a process-stop instruction state in the reference memory 22c that can be referred to by the transaction processing unit 22b and issues a transaction stop instruction to the transaction processing unit 22b.

A concrete explanation will be given of the contents of the transaction-stop confirmation process. The switching unit 22a checks the number of transactions stored in the reference memory 22c and, if the number of transactions is set to "0", the switching unit 22a determines that the transaction stop process has been completed. After the transaction stop process has been completed, the switching unit 22a ensures that the entire update log is restored on the standby node.

The switching unit 22a issues a transaction-stop instruction request to the DB servers 30 to 50 if its node receives a switch instruction from the AP server 10. If the node does not receive a switch instruction from the AP server 10, the switching unit 22a receives a transaction-stop instruction request from a different node.

The transaction processing unit 22b performs an SQL execution process and the transaction stop process. The SQL execution process corresponds to an "INSERT" process, a "DELETE" process, an "UPDATE" process, or the like. The transaction stop process corresponds to a commit process or a rollback process for transactions.

A concrete explanation will be given of the contents of the SQL execution process. Upon receiving a transaction stop instruction from the switching unit 22a, the transaction processing unit 22b determines whether the attribute of an SQL included in a transaction is an update SQL. If it is determined that the attribute of the SQL is the update SQL, the transaction processing unit 22b refers to the reference memory 22c and detects whether the process-stop instruction state is set in the reference memory 22c. If it is determined that the attribute of the SQL is not the update SQL (for example, if it is a reference SQL), the transaction processing unit 22b continues the SQL execution process without detecting whether the process-stop instruction state is set in the reference memory 22c.

Afterwards, if the transaction processing unit 22b detects that the process-stop instruction state is set in the reference memory 22c, the transaction processing unit 22b abnormally terminates a process of the update SQL.

If the transaction processing unit 22b detects that the process-stop instruction state is not set in the reference memory 22c, the transaction processing unit 22b confirms whether the update SQL is the first SQL of the transaction. If it is confirmed that the update SQL is the first SQL, the transaction processing unit 22b increments the number of executed transactions in the reference memory 22c and then continues the process of the update SQL. Conversely, if it is confirmed that the update SQL is not the first SQL, because the number of executed transactions has been incremented in the reference memory 22c, the transaction processing unit 22b continues the process of the update SQL without change.

A concrete explanation will be given of the contents of the transaction stop process. Upon receiving a commit request for a transaction from a user when an update SQL sentence has been normally completed, the transaction processing unit 22b performs a commit process and then decrements the number of executed transactions in the reference memory 22c to set the number of executed transactions stored in the reference memory 22c to "0", whereby the transaction stop process is completed. Thus, the transaction processing unit 22b decrements the number of executed transactions in the reference memory 22c after the commit process so that the transaction processing is stopped while the completion of the commit process is ensured.

If the transaction processing unit 22b does not receive the commit request but a rollback request for the transaction from a user who is aware that the process of the update SQL has not been normally completed (abnormally terminated) because it is detected that the transaction process-stop instruction state is set in the reference memory 22c, the transaction processing unit 22b decrements the number of executed transactions in the reference memory 22c to set the number of executed transactions stored in the reference memory 22c to "0", whereby the transaction stop process is completed, and also starts a rollback process. The transaction processing unit 22b starts the rollback process after decrementing the number of executed transactions in the reference memory 22c so that the transaction processing unit 22b stops the transaction processing independently of the execution of the rollback process.

Figure 3:
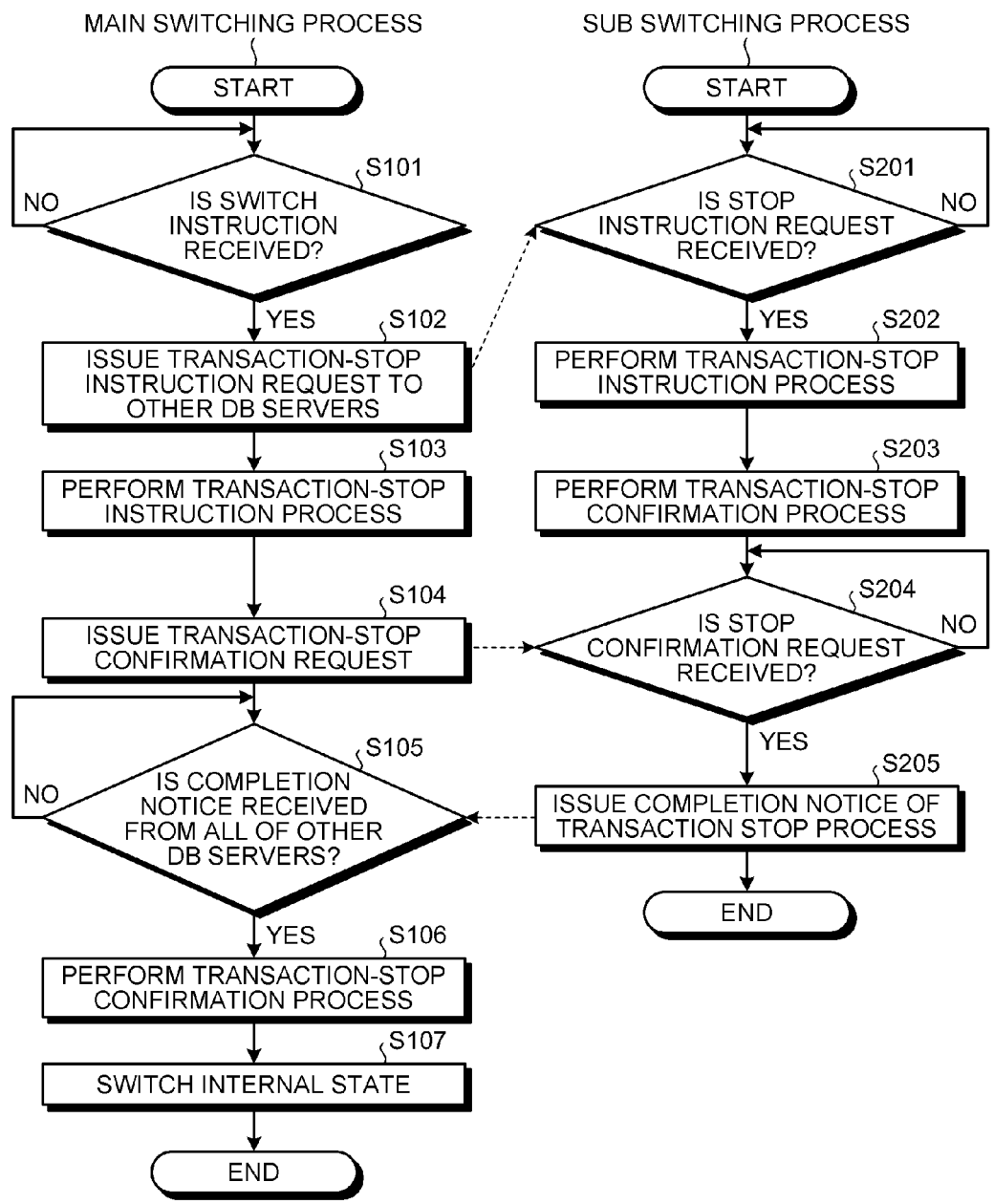
FIG. 3 is a flowchart of a switching process according to the first embodiment.
Figure 4:
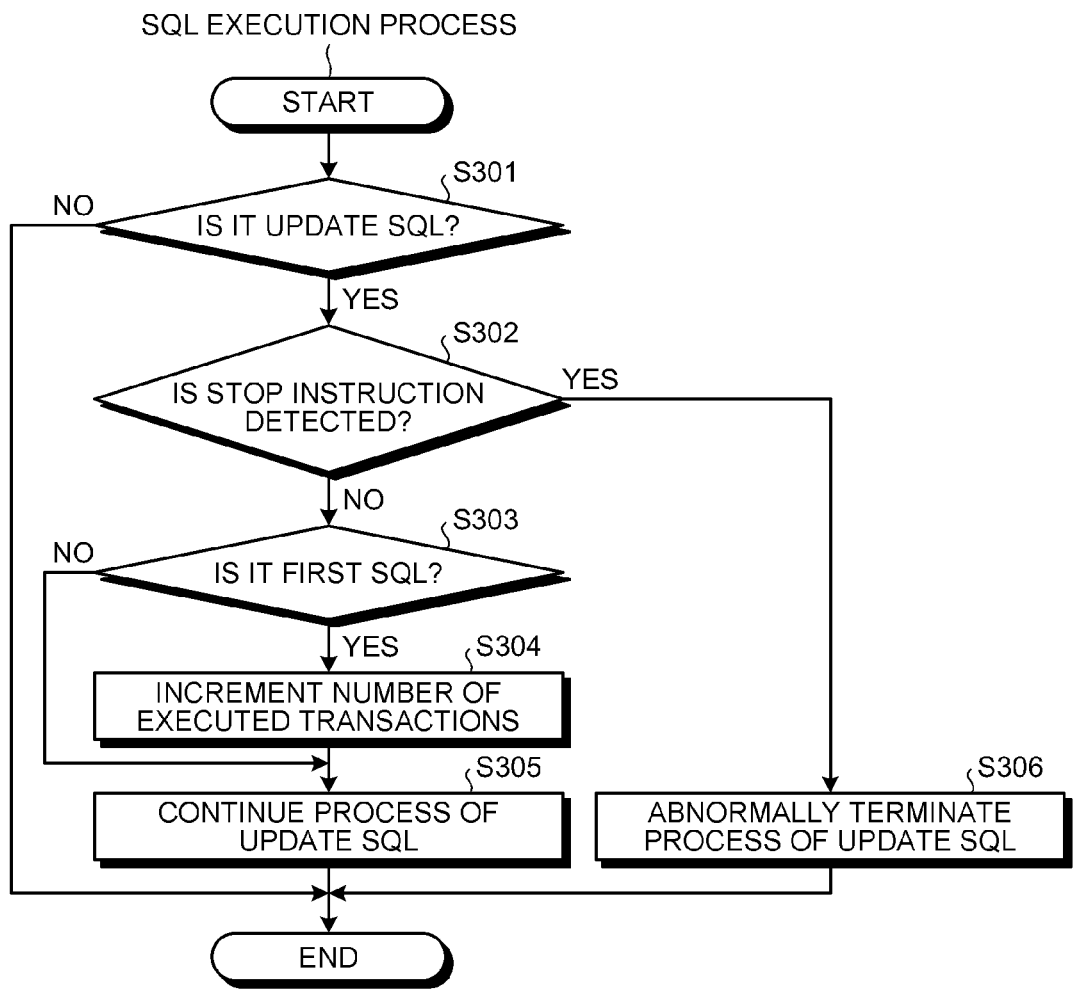
FIG. 4 is a flowchart of an SQL (structured query language) execution process according to the first embodiment.
Figure 5:
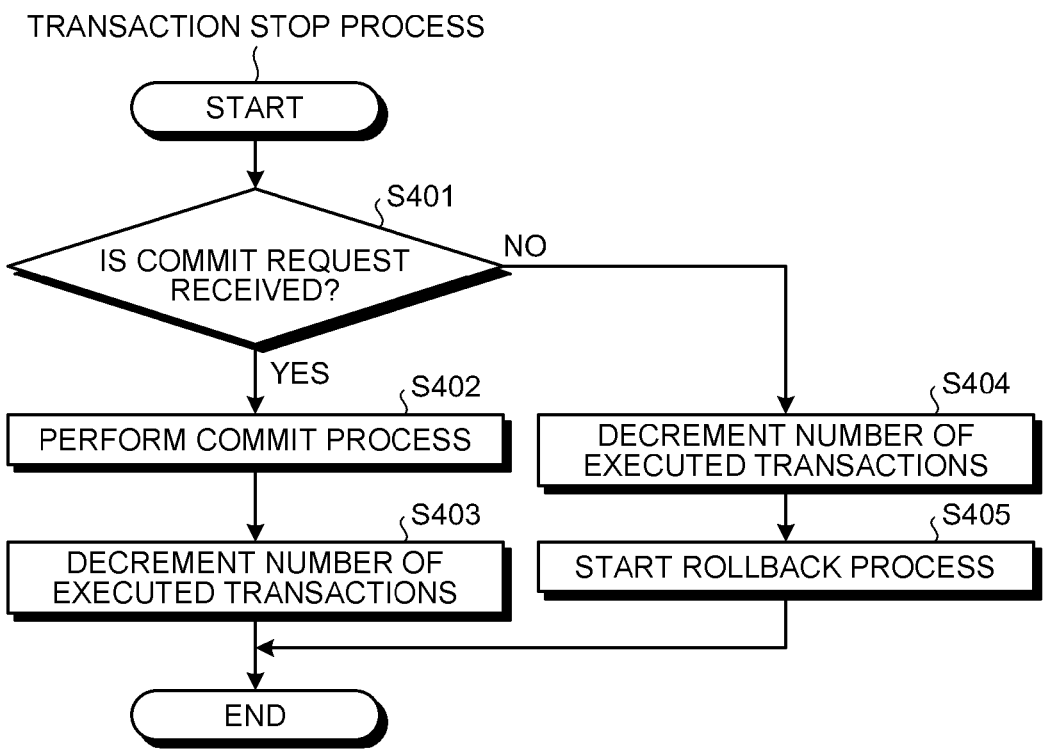
FIG. 5 is a flowchart of a transaction stop process according to the first embodiment.

A process of the DB server according to the first embodiment will be explained with reference to FIGS. 3 to 5. FIG. 3 is a flowchart of the switching process according to the first embodiment. FIG. 4 is a flowchart of the SQL execution process according to the first embodiment. FIG. 5 is a flowchart of the transaction stop process according to the first embodiment.

The switching process according to the first embodiment will be explained with reference to FIG. 3. In the following descriptions, a main switching process is a process performed by the DB server that receives a switch instruction from the AP server 10, and a sub switching process is a process performed by the DB server that receives a transaction-stop instruction request from a different DB server.

First, an explanation will be given of the main switching process. As depicted in FIG. 3, upon receiving a switch instruction from the AP server 10 (Yes at Step S101) the switching unit 22a of the DB server 20 issues a transaction-stop instruction request to the DB servers 30 to 50 (Step S102) and performs a transaction-stop instruction process (Step S103).

After performing the transaction-stop instruction process, the switching unit 22a of the DB server 20 issues a transaction-stop confirmation request to the DB servers 30 to 50 (Step S104). The switching unit 22a then confirms whether the completion notice of the transaction stop process has been received from all of the DB servers 30 to 50 (Step S105).

If it is confirmed that the completion notice has been received from all of the DB servers 30 to 50 (Yes at Step S105), the switching unit 22a of the DB server 20 performs a stop confirmation process to confirm whether the transaction stop process has been completed by the transaction processing unit of its node (Step S106). Conversely, if it is confirmed that the completion notice has not been received from all of the DB servers 30 to 50 (No at Step S105), the switching unit 22a waits for the completion notice.

If the switching unit 22a of the DB server 20 confirms that the transaction stop process of its node has been completed in the stop confirmation process, the switching unit 22a of the DB server 20 ensures that the entire update log is restored on the standby node and also causes the DB servers 30 to 50 to ensure that the entire update log is restored on the standby nodes. A part of processing, such as the process for restoring the update log on the standby node, performed by the switching unit can be performed by the standby node.

After ensuring that the update log is restored on the standby node, the switching unit of each of the DB servers 20 to 50 concurrently switches the standby node to a new operating node (Step S107).

Next, an explanation will be given of the sub switching process. As depicted in FIG. 3, upon receiving a transaction-stop instruction request from the DB server 20 (Step S201), the switching unit of each of the DB servers 30 to 50 performs a transaction-stop instruction process in the same manner as the DB server 20 (Step S202). After performing the transaction-stop instruction process, the switching unit of each of the DB servers 30 to 50 performs a transaction-stop confirmation process to confirm whether the transaction stop process has been completed (Step S203).

The switching unit of each of the DB servers 30 to 50 then confirms whether a transaction-stop confirmation request is received from the DB server 20 (Step S204). If it is confirmed that the transaction-stop confirmation request is received from the DB server 20 (Yes at Step S204), the switching unit of each of the DB servers 30 to 50 issues a completion notice of the transaction stop process to the DB server 20 (Step S205). Conversely, if it is confirmed that the transaction-stop confirmation request is not received from the DB server 20 (No at Step S204) the switching unit of each of the DB servers 30 to 50 waits for a transaction-stop confirmation request.

An explanation will be given of the SQL execution process according to the first embodiment with reference to FIG. 4. As depicted in FIG. 4, upon receiving a transaction stop instruction from the switching unit 22a, the transaction processing unit 22b determines whether the attribute of an SQL included in a transaction is an update SQL (Step S301). If it is determined that the attribute of the SQL is the update SQL (Yes at Step S301), the transaction processing unit 22b detects whether the process-stop instruction state is set in the reference memory 22c by referring to the reference memory 22c (Step S302). Conversely, if it is determined that the attribute of the SQL is not the update SQL (for example, if it is a reference SQL) (No at Step S301), the transaction processing unit 22b continues the SQL execution process without detecting whether the process-stop instruction state is set in the reference memory 22c.

Afterwards, if it is detected that the process-stop instruction state is not set in the reference memory 22c (No at Step S302), the transaction processing unit 22b confirms whether the update SQL is the first SQL of the transaction (Step S303). If it is confirmed that the update SQL is the first SQL (Yes at Step S303), the transaction processing unit 22b increments the number of executed transactions in the reference memory 22c (Step S304) and then continues the process of the update SQL (Step S305). Conversely, if it is confirmed that the update SQL is not the first SQL (No at Step S303), because the number of executed transactions has been incremented in the reference memory 22c, the transaction processing unit 22b continues the process of the update SQL without change.

A further explanation will be given of Step S302. If it is detected that the process-stop instruction state is set in the reference memory 22c (Yes at Step S302), the transaction processing unit 22b abnormally terminates the process of the update SQL (Step S306).

An explanation will be given of the transaction stop process according to the first embodiment with reference to FIG. 5. As depicted in FIG. 5, upon receiving a commit request for a transaction from a user when an update SQL sentence has been normally completed (Yes at Step S401) the transaction processing unit 22b performs a commit process (Step S402) and then decrements the number of executed transactions in the reference memory 22c (Step S403) to set the number of executed transactions stored in the reference memory 22c to "0", whereby the transaction stop process is completed. Thus, the transaction processing unit 22b decrements the number of executed transactions in the reference memory 22c after the commit process so that the transaction processing is stopped while the completion of the commit process is ensured.

A further explanation will be given of Step S401. If the transaction processing unit 22b does not receive the commit request but a rollback request for the transaction from a user who is aware that the process of the update SQL has not been normally completed (abnormally terminated) because it is detected that the transaction process-stop instruction state is set in the reference memory 22c (No at Step S401), the transaction processing unit 22b decrements the number of executed transactions in the reference memory 22c (Step S404) to set the number of executed transactions stored in the reference memory 22c to "0", whereby the transaction stop process is completed, and also starts a rollback process (Step S405). Furthermore, the transaction processing unit 22b starts the rollback process after decrementing the number of executed transactions in the reference memory 22c so that the transaction processing unit 22b stops the transaction processing independently of the execution of the rollback process.

As described above, according to the first embodiment, if a problem occurs in the DB server that functions as the operating node, the processing attribute and the processing state of a transaction are determined, and the transaction stop process is performed on the DB server that functions as the operating node depending on a determination result of the processing attribute and the processing state of the transaction. Afterward, the standby node is switched to a new operating node. Because the DBMS automatically selects, from transactions being processed by the operating node, a transaction for which the transaction stop process needs to be delayed upon switching the standby node to a new operating node, it is possible to keep the time required for stopping a transaction to a minimum and quickly switch a standby node to a new operating node.

Furthermore, according to the first embodiment, it is determined whether the processing attribute of an SQL included in a transaction is an update. If it is determined that the processing attribute is the update, it is determined whether the processing state is an execution state of an update transaction or an execution state of a commit process for the update transaction. If it is determined that the processing attribute is the update and the processing state is the execution state of the update transaction, a stop process is performed on the update transaction being processed. If it is determined that the processing attribute is the update and the processing state is the execution state of the commit process, a process for completing the commit process is performed. The standby node is switched to a new operating node without waiting for completion of the rollback process that is performed in accordance with execution of the stop process for the update transaction, or the standby node is switched to a new operating node after the commit process is completed. Therefore, it is possible to perform a process for switching the standby node to a new operating node without waiting for the completion of the rollback process that is performed in accordance with the execution of the stop process for the update transaction and to perform the process for switching the standby node to a new operating node in a short time. Moreover, the standby node can be switched to a new operating node after the commit process for an update process of a transaction being processed is completed so that it is possible to perform a process for switching the standby node to a new operating node after a certain time that is necessary for the commit process.

Although it is explained in the first embodiment that the present invention is applied to a full duplex system that includes a plurality of nodes, the present invention can be applied to a system that includes a single node, so that a standby node can be quickly switched to a new operating node.

Although it is explained in the first embodiment that the transaction processing unit determines the attribute of a transaction and increments or decrements the number of executed transactions to manage the state of the transaction and the switching unit determines whether the transaction stop process has been completed on the basis of the number of executed transactions and then performs the switching process, the present invention is not limited to such a configuration. Any method can be applied as long as the transaction processing unit can determine an operation to be performed by itself by determining the attribute and the state of the transaction and the switching unit can perform the switching process on the basis of the operation performed by the transaction processing unit.

Although it is explained in the first embodiment that one of the DB servers that receives a switch instruction from the AP server issues a stop instruction request to the other DB servers, the present invention is not limited to such a configuration. It is possible that each of the DB servers receives a switch instruction from the AP server and then performs processing.

Although the embodiment of the present invention has been described above, the present invention can be embodied in various different configurations other than the embodiment described above. In the following descriptions, another embodiment of the present invention will be explained.

First, a system configuration and the like will be described. Each of the components of the DB server 20 is depicted in FIG. 2 on the basis of a functional concept and does not necessarily need to be physically configured as depicted in FIG. 2. Specific forms of disintegration and integration of the DB server 20 are not limited to the one depicted in FIG. 2. It is possible that all or some of the components of the DB server 20 are functionally or physically disintegrated or integrated in an arbitrary unit depending on load or usage, for example, the switching unit 22*a* and the transaction processing unit 22*b* can be integrated. All or any of processing functions performed by the DB server 20 can be implemented by a central processing unit (CPU) and a computer program analyzed and executed by the CPU or implemented as wired logic hardware.

Among the processes described in the embodiment, all or some of the processes that are automatically performed as described above can be performed manually, or all or some of the processes that are manually performed as described above can be performed automatically by using a well-known method. Furthermore, the procedure, the control procedure, the specific names, the information including various data and parameters as described in the specifications and the drawings can be arbitrarily changed except as otherwise noted.

Figure 6:
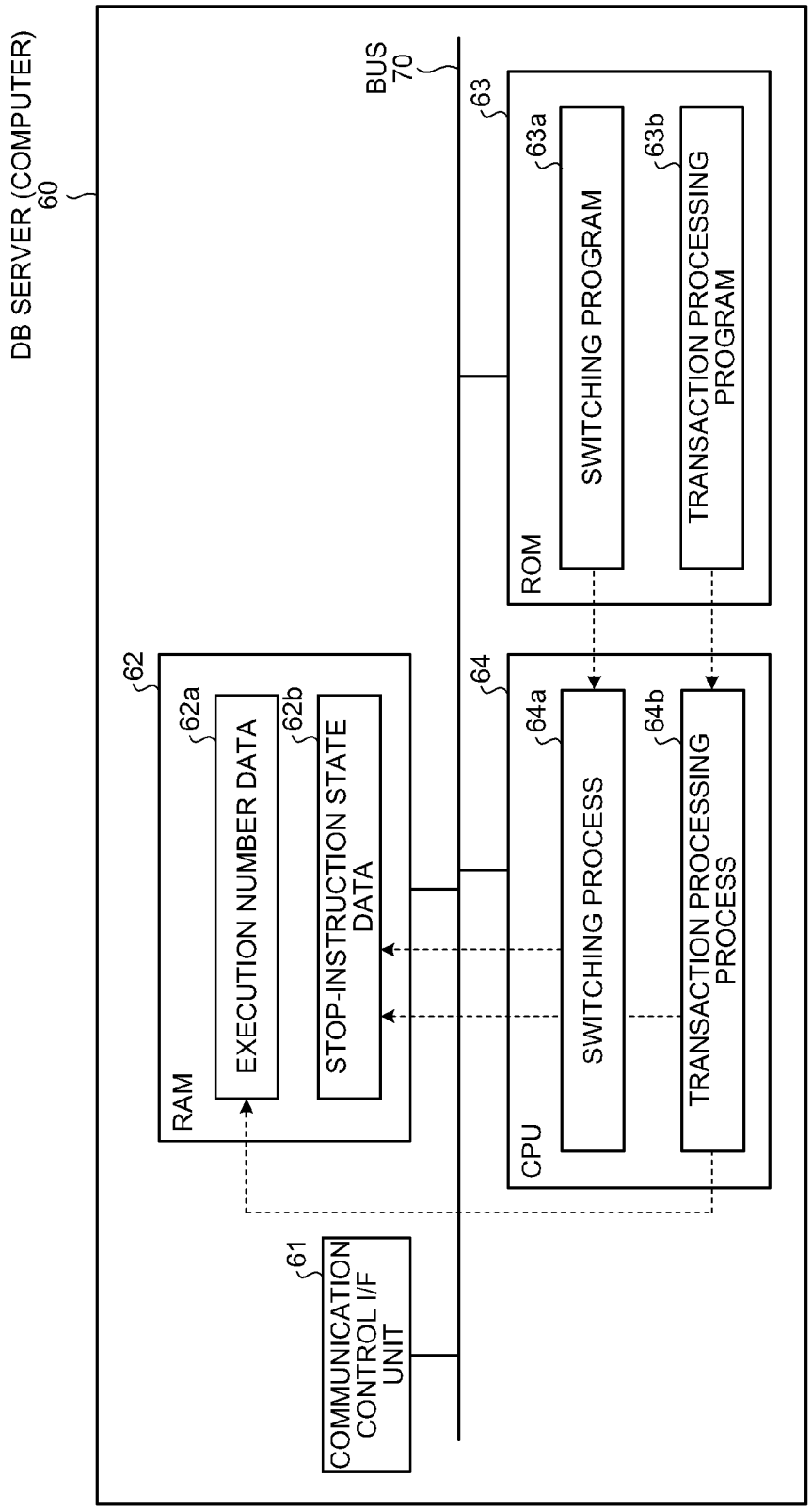
FIG. 6 is a diagram of a computer that executes a switching control program.
Figure 7:
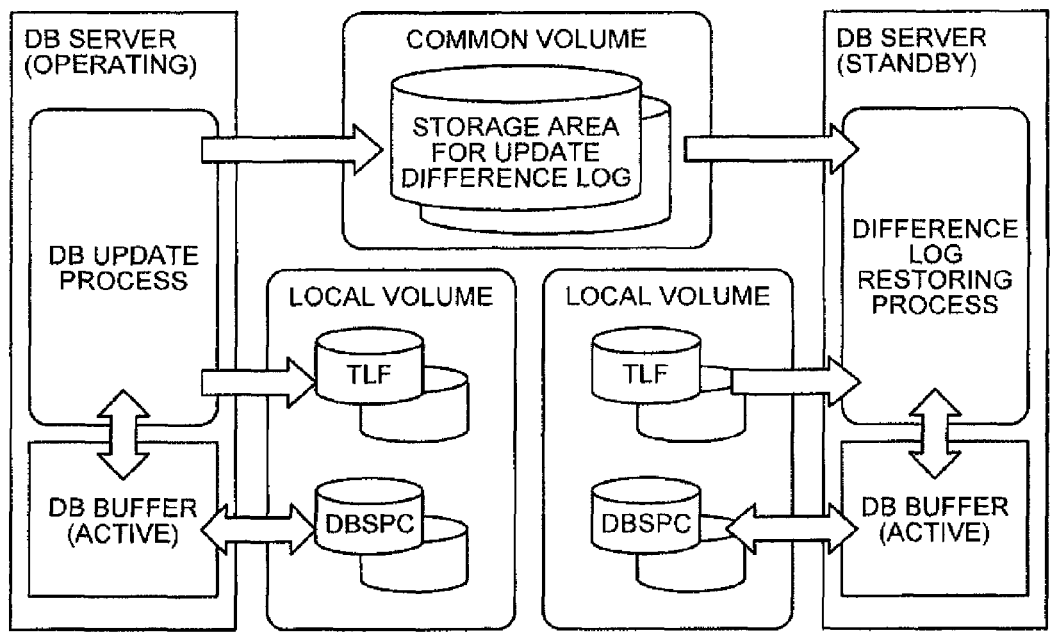
FIG. 7 is a diagram that explains a conventional technology.
Figure 8:
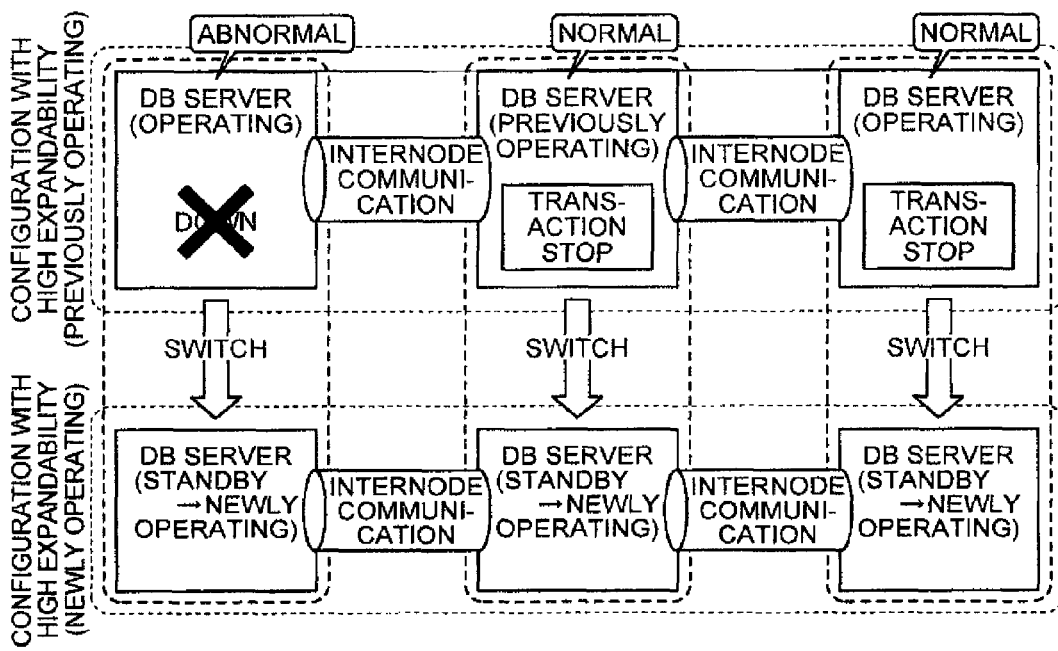
FIG. 8 is a diagram that explains a conventional technology.

Each of the various processes (see FIGS. 3 to 5, and the like) described in the above embodiment can be performed by executing prepared computer programs using a computer system such as a personal computer (PC) or a workstation. An explanation will be given below of an example of a computer that executes a switching program that has the same functions as those described in the above embodiment with reference to FIG. 6. FIG. 6 is a diagram of a computer that executes a switching program.

As depicted in FIG. 6, a computer 60 that functions as a DB server includes a communication control I/F unit 61, a PAM 62, a ROM 63, and a CPU 64 that are connected to one another via a bus 70.

The ROM 63 previously stores therein switching programs, i.e., a switching program 63*a* and a transaction processing program 63*b* as depicted in FIG. 6, for performing the same functions as those of the DB server described in the above embodiment. The switching program 63*a* and the transaction processing program 63*b* can be integrated or disintegrated as appropriate in the same manner as each of the components of the DB server depicted in FIG. 2. The ROM 63 can be a nonvolatile "RAM".

The CPU 64 reads the switching program 63*a* and the transaction processing program 63*b* from the ROM 63 and executes the read switching program 63*a* and the read transaction processing program 63*b*, whereby the switching program 63*a* and the transaction processing program 63*b* function as a switching process 64*a* and a transaction processing process 64*b* as depicted in FIG. 6. The switching process 64*a* and the transaction processing process 64*b* correspond to the switching unit 22*a* and the transaction processing unit 22*b*, respectively, of the DB server 20 as depicted in FIG. 2.

The RAM 62 stores therein execution number data 62*a* and stop-instruction state data 62*b* both used for processes executed by the CPU 64. The execution number data 62*a* and the stop-instruction state data 62*b* correspond to data about the transaction-stop instruction state and data about the number of executed transactions, respectively, stored in the reference memory 22*c* depicted in FIG. 2. The CPU 64 performs processing based on the execution number data 62*a* and the stop-instruction state data 62*b* stored in the RAM 62 (for example, the CPU 64 performs processing to directly "UPDATE" data stored in the RAM 62).

The switching program 63*a* and the transaction processing program 63*b* do not necessarily need to be stored in the ROM 63 from the beginning. For example, it is possible that the switching program 63*a* and the transaction processing program 63*b* are stored in a "portable physical medium", such as a flexible disk (FD), a CD-ROM, a digital versatile disk (DVD), a magneto-optical disk, or an IC card, to be inserted into the computer 60, a "fixed physical medium", such as an HDD, arranged inside or outside of the computer 60, or a "different computer (or server)" connected to the computer 60 via a public line, the Internet, a LAN, a WAN, or the like. The computer 60 reads each of the switching program 63*a* and the transaction processing program 63*b* from the portable physical medium, the fixed physical medium, or the different computer and executes the read switching program 63*a* and the read transaction processing program 63*b*.

According to the embodiments, the DBMS automatically selects, from transactions being processed by the operating node, a transaction for which a transaction stop process needs to be delayed upon switching a standby node to a new operating node so that it is possible to keep a time required for stopping a transaction to a minimum and quickly switch the standby node to a new operating node.

According to the embodiments, it is possible to perform a process for switching the standby node to a new operating node without waiting for completion of a rollback process that is performed in accordance with the execution of a stop process for an update transaction and to perform the process for switching the standby node to a new operating node in a short time. Moreover, the standby node can be switched to a new operating node after a commit process for an update process of a transaction being executed is completed so that it is possible to perform a process for switching the standby node to a new operating node after a certain time that is necessary for the commit process.

According to the embodiments, if a system includes a plurality of nodes, a stop process for a transaction being processed in each operating node can be quickly completed and each standby node can be promptly switched to a new operating node.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer-readable medium storing therein a switching program for use in a duplex system including an operating node for processing a transaction that is a unit of a series of processes, the duplex system including a standby node for recovering the transaction processed by the operating node, the switching program causing a computer to execute:
   determining, if a problem occurs in the operating node, whether a processing attribute of the transaction processed by the operating node is an update and, if it is determined that the processing attribute is the update, determining whether a processing state of the transaction processed by the operating node is any one of an execution state of an update transaction or an execution state of a commit process for the update transaction;
   executing, if it is determined that the processing attribute is the update and the processing state is the execution state of the update transaction at the determining, a stop process for the update transaction being processed, or executing, if it is determined that the processing attribute is the update and the processing state is the execution state of the commit process, a process for completing the commit process being executed; and
   switching the standby node to a new operating node after the stop process is executed at the executing without waiting for completion of a rollback process that is performed in accordance with execution of the stop process for the update transaction at the executing, or switching the standby node to the new operating node after the commit process is completed at the executing.

2. The non-transitory computer-readable medium according to claim 1, wherein:
   the duplex system includes a plurality of operating nodes and a plurality of standby nodes, wherein the switching program further causes the computer to execute:
   determining, if a problem occurs in any one of the operating nodes, a processing attribute and a processing state of a transaction processed by each of the operating nodes;
   executing a stop process to stop the transaction processed by each of the operating nodes depending on a determination result of the processing attribute and the processing state determined at the determining; and
   switching the standby node to a new operating node after the stop process is executed on each of the operating nodes at the executing.

3. The non-transitory computer-readable medium according to claim 1, wherein the switching program further causes the computer to execute:
   storing the processing state according to a setting,
   wherein the determining determines the processing state based on the processing state stored in the storing.

4. The non-transitory computer-readable medium according to claim 1, wherein the switching program further causes the computer to execute:
   storing a number of executed transactions,
   wherein the determining determines whether the stop process is executed based on the number of executed transactions stored in the storing.

5. The non-transitory computer-readable medium according to claim 4, wherein the executing increments and decrements the number of executed transactions stored in accordance with an execution state of the stop process.

6. A switching method for use in a duplex system including an operating node for processing a transaction that is a unit of a series of processes, the duplex system including a standby node for recovering the transaction processed by the operating node, the switching method comprising:
   determining, if a problem occurs in the operating node, whether a processing attribute of the transaction processed by the operating node is an update and, if it is determined that the processing attribute is the update, determining whether a processing state of the transaction processed by the operating node is any one of an execution state of an update transaction or an execution state of a commit process for the update transaction;
   executing, if it is determined that the processing attribute is the update and the processing state is the execution state of the update transaction at the determining, a stop process for the update transaction being processed, or executing, if it is determined that the processing attribute is the update and the processing state is the execution state of the commit process, a process for completing the commit process being executed; and
   switching the standby node to a new operating node after the stop process is executed at the executing without waiting for completion of a rollback process that is performed in accordance with execution of the stop process for the update transaction at the executing, or switching the standby node to the new operating node after the commit process is completed at the executing.

7. The switching method according to claim 6, wherein the duplex system includes a plurality of operating nodes and a plurality of standby nodes,
   wherein the switching method further comprises:
   determining, if a problem occurs in any one of the operating nodes, a processing attribute and a processing state of a transaction processed by each of the operating nodes;
   executing a stop process to stop the transaction processed by each of the operating nodes depending on a determination result of the processing attribute and the processing state determined at the determining; and
   switching the standby node to a new operating node after the stop process is executed on each of the operating nodes at the executing.

8. The switching method according to claim 6, wherein the switching program further causes the computer to execute:
   storing the processing state according to a setting,
   wherein the determining determines the processing state based on the processing state stored in the storing.

9. The switching method according to claim 6, wherein the switching program further causes the computer to execute:

storing a number of executed transactions, wherein the determining determines whether the stop process is executed based on the number of executed transactions stored in the storing.

10. The switching method according to claim 9, wherein the executing increments and decrements the number of executed transactions stored in accordance with an execution state of the stop process.

11. A duplex system including an operating node for processing a transaction that is a unit of a series of processes, the duplex system including a standby node for recovering the transaction processed by the operating node, the duplex system comprising:

a determining unit that determines, if a problem occurs in the operating node, whether a processing attribute of the transaction processed by the operating node is an update and, if it is determined that the processing attribute is the update, determining whether a processing state of the transaction processed by the operating node is any one of an execution state of an update transaction or an execution state of a commit process for the update transaction;

an executing unit that executes, if it is determined that the processing attribute is the update and the processing state is the execution state of the update transaction by the determining unit, a stop process for the update transaction being processed, or executes, if it is determined that the processing attribute is the update and the processing state is the execution state of the commit process, a process for completing the commit process being executed; and a switching unit that switches the standby node to a new operating node after the executing unit executes the stop process without waiting for completion of a rollback process that is performed in accordance with execution of the stop process for the update transaction by the executing unit, or switches the standby node to the new operating node after the commit process is completed by the executing unit.

12. The duplex system according to claim 11, wherein:

the duplex system includes a plurality of operating nodes and a plurality of standby nodes, the determining unit determines, if a problem occurs in any one of the operating nodes, a processing attribute and a processing state of a transaction processed by each of the operating nodes;

the executing unit executes a stop process to stop the transaction processed by each of the operating nodes depending on a determination result of the processing attribute and the processing state determined by the determining unit; and the switching unit switches the standby node to a new operating node after the executing unit executes the stop process on each of the operating nodes.

13. The duplex system according to claim 11, further comprising:

a storage unit that stores the processing state according to a setting, wherein the determining unit determines the processing state based on the processing state stored in the storage unit.

14. The duplex system according to claim 11, further comprising:

a storage unit that stores a number of executed transactions, wherein the determining unit determines whether the stop process is executed based on the number of executed transactions stored in the storage unit.

15. The duplex system according to claim 14, wherein the executing unit increments and decrements the number of executed transactions stored in the storage unit in accordance with an execution state of the stop process.

* * * * *